(12) United States Patent
Ota et al.

(10) Patent No.: US 7,887,714 B2
(45) Date of Patent: Feb. 15, 2011

(54) CERIUM OXIDE SOL AND ABRASIVE

(75) Inventors: Isao Ota, Nei-gun (JP); Kenji Tanimoto, Nei-gun (JP); Tohru Nishimura, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/015,675

(22) Filed: Dec. 17, 2001

(65) Prior Publication Data

US 2002/0086618 A1    Jul. 4, 2002

(30) Foreign Application Priority Data

| Dec. 25, 2000 | (JP) | 2000-392592 |
| Dec. 25, 2000 | (JP) | 2000-392593 |
| May 10, 2001 | (JP) | 2001-140014 |
| May 10, 2001 | (JP) | 2001-140015 |

(51) Int. Cl.
    *C09K 13/00*    (2006.01)
(52) U.S. Cl. .............. 252/79; 252/79.1; 252/79.2; 252/79.3; 252/79.4; 502/302; 502/349
(58) Field of Classification Search ....... 252/79.1–79.4; 438/692; 423/593, 592; 451/41; 502/349, 502/302

See application file for complete search history.

(56) References Cited

U.S. PATENT DOCUMENTS

| 4,769,073 A | * | 9/1988 | Tastu et al. ............... 106/3 |
| 4,786,325 A | | 11/1988 | Melard et al. |
| 5,264,010 A | * | 11/1993 | Brancaleoni et al. ........ 51/308 |

(Continued)

FOREIGN PATENT DOCUMENTS

EP    0 031 749 A2    7/1981

(Continued)

OTHER PUBLICATIONS

Harrison, "Chemical Microengineering in Sol-Gel Derived Fluoride and Lanthanide Modified Ceria Materials", Journal of Sol-Gel Science and Technology 13, pp. 1049-1055, 1998.

*Primary Examiner*—Nadine G Norton
*Assistant Examiner*—Maki A Angadi
(74) *Attorney, Agent, or Firm*—Oliff & Berridge, PLC

(57) ABSTRACT

There is provided an abrasive used for polishing a substrate which comprises silica as a main component, for example a rock crystal, a quartz glass for photomask, for CMP of an organic film, Inter Layer Dielectric (ILD) and shallow trench isolation of a semiconductor device, or for polishing a hard disk made of glass.

A sol which particles are dispersed in a medium, wherein the particles have a particle size of 0.005 to 1 μm and comprise as a main component crystalline cerium oxide of the cubic system and as an additional component a lanthanum compound, a neodymium compound or a combination thereof, wherein the additional component is contained in X/(Ce+X) molar ratio of 0.001 to 0.5 in which X is lanthanum atoms, neodymium atoms or a combination thereof.

The sol is prepared by reacting an aqueous solution which a cerium (III) salt is mixed with a lanthanum (III) salt and/or a neodymium (III) salt, with an alkaline substance to give a suspension in which cerium (III) hydroxide is homogeneously mixed with lanthanum (III) hydroxide and/or neodymium (III) hydroxide, and blowing oxygen or a gas containing oxygen into the suspension.

10 Claims, 10 Drawing Sheets

U.S. PATENT DOCUMENTS

| | | | |
|---|---|---|---|
| 5,804,513 A * | 9/1998 | Sakatani et al. | 438/693 |
| 5,962,343 A * | 10/1999 | Kasai et al. | 438/693 |
| 6,136,048 A * | 10/2000 | Birchem et al. | 44/354 |
| 6,171,572 B1 * | 1/2001 | Aozasa | 423/594.12 |
| 6,454,821 B1 * | 9/2002 | Abbasi et al. | 51/309 |

FOREIGN PATENT DOCUMENTS

| | | |
|---|---|---|
| EP | 444470 A1 * | 9/1991 |
| EP | 0 822 164 A2 | 2/1998 |
| JP | A 56-131686 | 10/1981 |
| JP | A 60-35393 | 2/1985 |
| JP | B2 60-35393 | 8/1985 |
| JP | A 63-27389 | 2/1988 |
| JP | B2 63-27389 | 6/1988 |
| JP | A 10-95614 | 4/1998 |
| WO | WO 00/76920 A1 | 12/2000 |

* cited by examiner

FIG. 4    Example 1
100 nm

FIG. 5    Example 3
100 nm

FIG. 6   Example 5
100 nm

FIG. 7  Example 6
100 nm

FIG. 8    Comparative Example 1
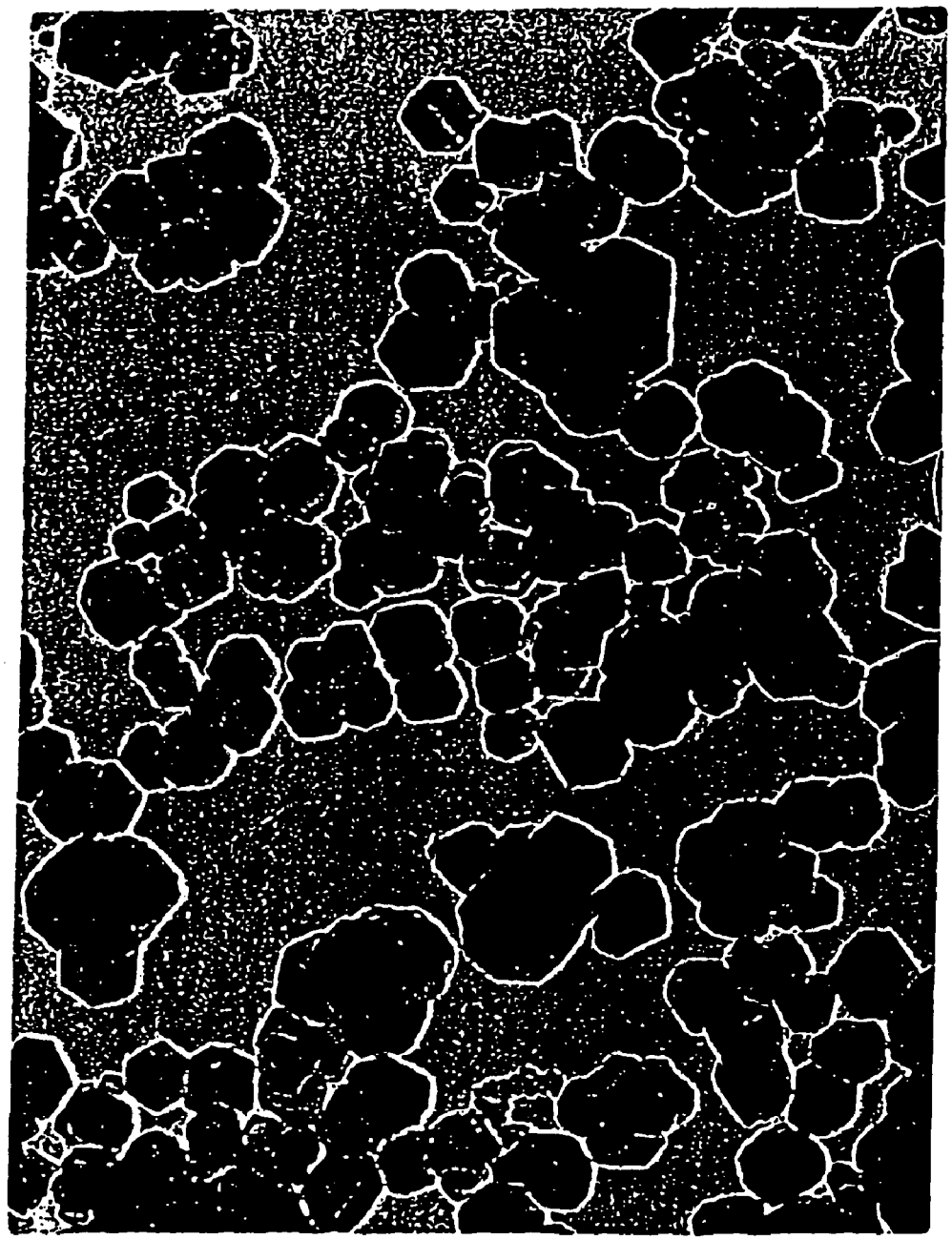
100 nm

FIG. 9   Comparative Example 3
1 μm

FIG. 10  Comparative Example 4
400 nm

CERIUM OXIDE SOL AND ABRASIVE

BACKGROUND OF THE INVENTION

1. Field of the Invention

The present invention relates to a sol which particles containing cerium oxide as a main component and lanthanum compounds or neodymium compounds are dispersed into a medium, and a process for producing of the sol. The particles containing cerium oxide as a main component and lanthanum or neodymium as other component can be used as abrasives, ultraviolet absorbing materials, catalyst materials, fuel cell materials and the like.

2. Description of the Related Art

Japanese Patent Laid-open No. Sho 56-131686 discloses a cerium oxide powder containing lanthanum wherein the powder is produced by mixing simultaneously cerium salt, a basic solution and a solution of salt in which an anion can form an insoluble rare earth oxide, the resulting precipitate is filtered out, drying it at a temperature of 100 to 600° C., calcinating at a temperature of 600 to 1200° C., and pulverizing the calcined material.

Japanese Patent Laid-open No. Hei 10-95614 discloses a process for producing crystalline cerium oxide powders having a particle size of 0.005 to 5 μm in which the process comprises reacting a cerium (III) salt with an alkaline substance in $(OH^-)/(Ce^{3+})$ molar ratio of 3 to 30 to form a suspension of cerium (III) hydroxide, and immediately blowing oxygen or a gas containing oxygen into the suspension under atmospheric pressure at a temperature of 10 to 95° C.

Japanese Patent Publication No. Sho 63-27389 discloses a polishing composition comprising 40 to 99.5 wt % of ceric oxide and 0.5 to 60 wt % of at least one colorless oxide of other rare earth element selected from the group consisting of lanthanide and yttrium.

Japanese Patent Publication No. Sho 60-35393 discloses a polishing composition of cerium system corresponding to the following formula:

$Ln_{2-x}Ce_xSi_2O_7$ wherein Ln is at least one element selected from the group consisting of lanthanoid and yttrium and x is a number of not less than 0 and less than 2.

The process for producing ceric oxide powders comprising drying, calcination and pulverization in which the powders contain lanthanum or neodymium, gives powders having uneven particle size and merely gives powders of submicron order at most because the pulverization is employed in order to finely divide particles.

SUMMARY OF THE INVENTION

Accordingly, the present inventors intends to develop a process for producing finely divided particles having even particle size and the particle size less than submicron order by carrying out nucleation and crystal growth in aqueous solution to produce particles containing cerium oxide as main component together with lanthanum and neodymium as other components, and led to the present invention.

According to a first aspect of the present invention, there is provided a sol which particles are dispersed in a medium, wherein the particles have a particle size of 0.005 to 1 μm and comprise as a main component crystalline cerium oxide of the cubic system and as an additional component a lanthanum compound, neodymium compound or a combination thereof, wherein the additional component is contained in X/(Ce+X) molar ratio of 0.001 to 0.5 in which X is lanthanum atoms, neodymium atoms or a combination thereof.

According to a second aspect of the present invention, in the sol of the first aspect, the additional component is a lanthanum compound.

According to a third aspect of the present invention, in the sol of the first aspect, the additional component is a neodymium compound.

According to a fourth aspect of the present invention, there is also provided a process for producing a sol which particles are dispersed in a medium, wherein the particles have a particle size of 0.005 to 1 μm and comprise as a main component crystalline cerium oxide of the cubic system and as an additional component a lanthanum compound, neodymium compound or a combination thereof, wherein the additional component is contained in X/(Ce+X) molar ratio of 0.001 to 0.5 in which X is lanthanum atoms, neodymium atoms or a combination thereof, characterized in that the process comprises the steps:

a first step of reacting an aqueous solution which a cerium (III) salt is mixed with a lanthanum (III) salt, a neodymium (III) salt or a combination thereof in an aqueous medium in X/(Ce+X) molar ratio of 0.001 to 0.5, with an alkaline substance in $(OH^-)/(Ce^{3+}+X^{3+})$ molar ration of 3 to 30 to give a suspension in which cerium (III) hydroxide and a hydroxide of the trivalent additional component X are homogeneously mixed; and a second step of blowing oxygen or a gas containing oxygen into the suspension at a temperature of 10 to 95° C.

According to a fifth aspect of the present invention, in the process for producing of the fourth aspect, the first step is carried out under open to the air.

According to a sixth aspect of the present invention, in the process for producing of the fourth aspect, the first step is carried out under an atmosphere of an inert gas.

According to a seventh aspect of the present invention, in the process for producing of the fourth aspect, the cerium (III) salt is cerium (III) nitrate, ammonium cerium (III) nitrate, cerium (III) sulfate, ammonium cerium (III) sulfate, cerium (III) chloride, cerium (III) carbonate, cerium (III) acetate, cerium (III) oxalate or a mixture thereof.

According to an eighth aspect of the present invention, in the process for producing of the fourth aspect, the lanthanum (III) salt is lanthanum (III) nitrate, lanthanum (III) chloride, lanthanum (III) acetate, lanthanum (III) oxalate or a mixture thereof.

According to a ninth aspect of the present invention, in the process for producing of the fourth aspect, the neodymium (III) salt is neodymium (III) nitrate, neodymium (III) chloride, neodymium (III) acetate, neodymium (III) oxalate or a mixture thereof.

According to a tenth aspect of the present invention, there is provided an abrasive containing a sol which particles are dispersed in a medium, wherein the particles have a particle size of 0.005 to 1 μm and comprise as a main component crystalline cerium oxide of the cubic system and as an additional component a lanthanum compound, neodymium compound or a combination thereof, wherein the additional component is contained in X/(Ce+X) molar ratio of 0.001 to 0.5 in which X is lanthanum atoms, neodymium atoms or a combination thereof.

According to an eleventh aspect of the present invention, there is further provided an abrasive containing a sol which particles are dispersed in a medium, wherein the particles have a particle size of 0.005 to 1 μm and comprise as a main component crystalline cerium oxide of the cubic system and as an additional component a lanthanum compound, neodymium compound or a combination thereof, wherein the additional component is contained in X/(Ce+X) molar ratio of 0.001 to 0.5 in which X is lanthanum atoms, neodymium atoms or a combination thereof, characterized in that the sol is produced according to the steps:

a first step of reacting an aqueous solution which a cerium (III) salt is mixed with a lanthanum (III) salt, a neodymium (III) salt or a combination thereof in an aqueous medium in X/(Ce+X) molar ratio of 0.001 to 0.5, with an alkaline substance in $(OH^-)/(Ce^{3+}+X^{3+})$ molar ration of 3 to 30 to give a suspension in which cerium (III) hydroxide and a hydroxide of the trivalent additional component X are homogeneously mixed; and a second step of blowing oxygen or a gas containing oxygen into the suspension at a temperature of 10 to 95° C.

According to a twelfth aspect of the present invention, in the abrasive of the tenth or eleventh aspect, the additional component is a lanthanum compound.

According to a thirteenth aspect of the present invention, in the abrasive of the tenth or eleventh aspect, the additional component is a neodymium compound.

According to a fourteenth aspect of the present invention, in the abrasive of the tenth or eleventh aspect, the abrasive is adjusted with an acidic substance to a pH of 1 to 6.

According to a fifteenth aspect of the present invention, in the abrasive of the tenth or eleventh aspect, the abrasive is adjusted with a basic substance to a pH of 8 to 13.

According to a sixteenth aspect of the present invention, in the abrasive of the tenth or eleventh aspect, the abrasive is used for polishing a substrate which comprises silica as a main component.

According to a seventeenth aspect of the present invention, in the abrasive of the tenth or eleventh aspect, the abrasive is used for polishing a rock crystal, a quartz glass for photomask, a semiconductor device or a hard disk made of glass.

According to an eighteenth aspect of the present invention, in the abrasive of the tenth or eleventh aspect, the abrasive is used in a step of polishing an organic film, a step of polishing Inter Layer Dielectric (ILD) or a step of shallow trench isolation, for polishing a semiconductor device.

BRIEF DESCRIPTION OF THE DRAWINGS

In the accompanying drawings,

FIG. 4 is a photograph showing the structure of particles prepared in Example 1 is shown with the aid of the transmission electron microscope in the magnification of ×200,000;

FIG. 5 is a photograph which the structure of particles obtained in Example 3 is shown with the aid of the transmission electron microscope in the magnification of ×200,000;

FIG. 6 is a photograph which the structure of particles obtained in Example 5 is shown with the aid of the transmission electron microscope in the magnification of ×200,000;

FIG. 7 is a photograph which the structure of particles obtained in Example 6 is shown with the aid of the transmission electron microscope in the magnification of ×200,000;

FIG. 8 is a photograph which the structure of particles obtained in Comparative Example 1 is shown with the aid of the transmission electron microscope in the magnification of ×200,000;

FIG. 9 is a photograph which the structure of particles obtained in Comparative Example 3 is shown with the aid of the transmission electron microscope in the magnification of ×20,000; and FIG. 10 is a photograph which the structure of particles obtained in Comparative Example 4 is shown with the aid of the transmission electron microscope in the magnification of ×50,000.

DESCRIPTION OF THE PREFERRED EMBODIMENTS

Figure 1:
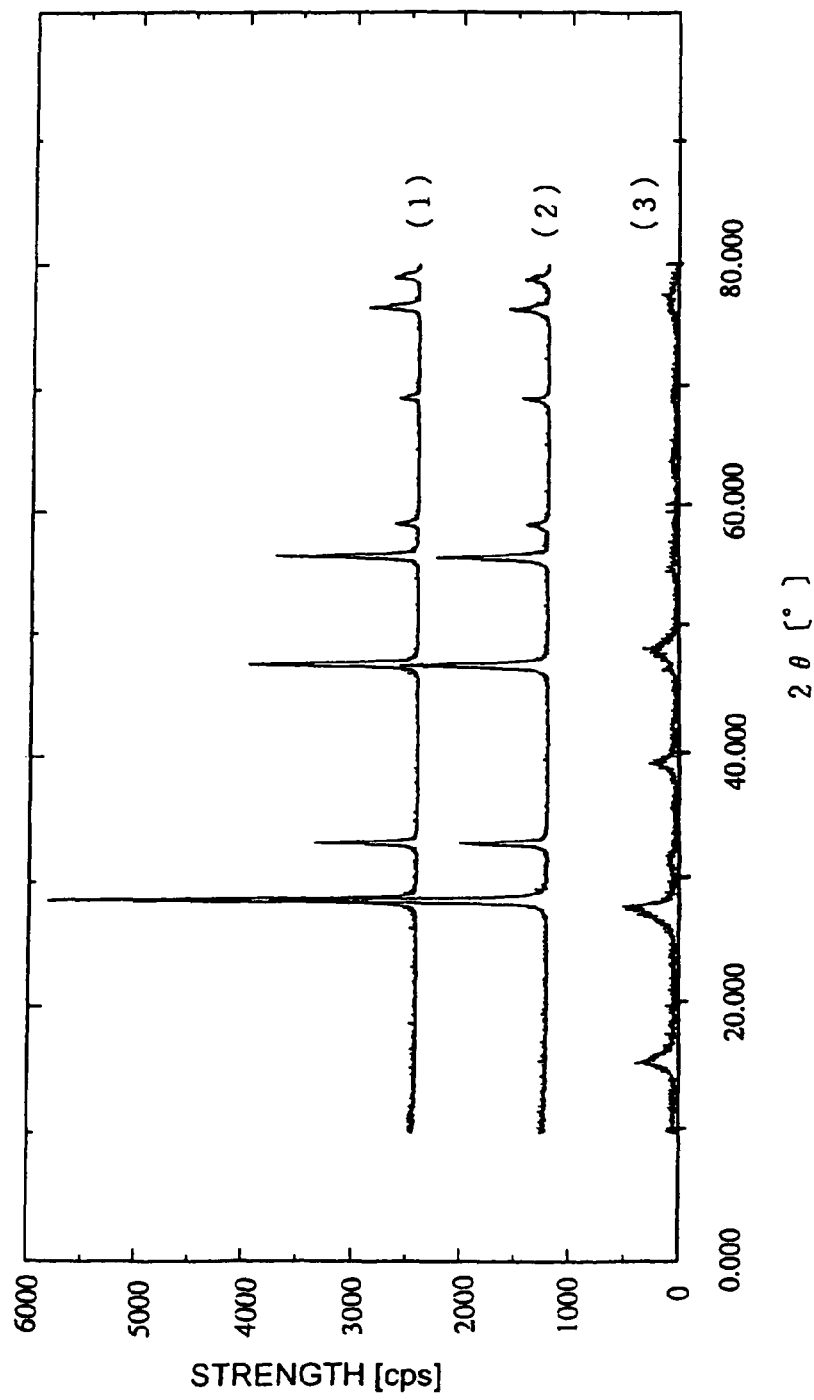
FIG. 1 is a chart showing powder X-ray diffraction observed for the powders prepared in Example 1 and Comparative Examples 1 and 3, wherein (1) indicates powder X-ray diffraction observed for particles containing lanthanum compound in La/(Ce+La) molar ratio of 0 (that is, cerium oxide particles) that are prepared in Comparative Example 1, (2) indicates powder X-ray diffraction observed for particles containing lanthanum compound in La/(Ce+La) molar ratio of 0.05 that are prepared in Example 1, and (3) indicates powder X-ray diffraction observed for particles containing lanthanum compound in La/(Ce+La) molar ratio of 1 (that is, lanthanum hydroxide particles) that are prepared in Comparative Example 3.

The sol obtained in the present invention comprises particles dispersed in a medium wherein the particles contain cerium oxide as a main component. The particles containing cerium oxide as a main component are formed through the first step and the second step described above, and have the following characteristics: (i) the particles have the particle size of 0.005 to 1 μm; and (ii) the particles contain as additional component X a lanthanum compound, a neodymium compound or a combination thereof in X/(Ce+X) molar ratio of 0.001 to 0.5, preferably 0.005 to 0.15.

The sol which the particles containing cerium oxide as a main component are dispersed in a medium is obtained through the first step and the second step.

The first step may be a method processed under open to the air or a method processed under an atmosphere of an inert gas.

In case where the first step is carried out under open to the air, because a mixture of cerium (III) hydroxide with lanthanum (III) hydroxide, neodymium (III) hydroxide or a combination thereof in a suspension is oxidized by a gas containing oxygen in the first step to the following second step, a number of nuclei are generated in the suspension, thereby the particle size distribution of the resulting particles becomes broad. The first step is processed at a temperature of 0 to 95° C. for 10 minutes to 3 hours.

The second step is processed at a temperature of 10 to 95° C. for 1 to 20 hours. In addition, each of the first step and the second step can be processed under ordinary pressure.

On the other hand, in case where the first step is carried out under an atmosphere of an inert gas, because a mixture of cerium (III) hydroxide with lanthanum (III) hydroxide, neodymium (III) hydroxide or a combination thereof in a suspension is not oxidized and the second step is carried out in the state of hydroxide, the particle size distribution of the resulting particles becomes narrow. The first step is processed at a temperature of 0 to 95° C. for 10 minutes to 3 hours. The second step is processed immediately after the completion of the first step. The second step is processed at a temperature of 10 to 95° C. for 1 to 20 hours. In addition, each of the first step and the second step can be processed under ordinary pressure.

The cerium (III) salts used in the first step include, for example water-soluble cerous (trivalent cerium) salt such as cerium (III) nitrate, ammonium cerium (III) nitrate, cerium (III) sulfate, ammonium cerium (III) sulfate, cerium (III) chloride, cerium (III) carbonate, cerium (III) acetate, cerium (III) oxalate or a mixture thereof.

The lanthanum (III) salts include, for example water-soluble trivalent lanthanum salts, such as lanthanum (III) nitrate, lanthanum (III) chloride, lanthanum (III) carbonate, lanthanum (III) acetate, lanthanum (III) oxalate or a mixture thereof.

The neodymium (III) salts include, for example water-soluble trivalent neodymium salts, such as neodymium (III) nitrate, neodymium (III) chloride, neodymium (III) carbonate, neodymium (III) acetate, neodymium (III) oxalate or a mixture thereof.

The inert gases include, for example nitrogen gas, argon gas and the like, preferably nitrogen gas.

The alkaline substances include, for example alkaline metal hydroxides, such as sodium hydroxide and potassium hydroxide; organic bases, such as ammonia, amines and quaternary ammonium hydroxide. In particular, ammonia, sodium hydroxide and potassium hydroxide are preferred. These may be used alone or as mixtures.

In the second step, gases containing oxygen include, for example air, oxygen, a mixed gas of oxidizing gas, such as oxygen with an inert gas, such as nitrogen. Air is preferable from the view points of economical efficiency and handling. These gases are induced into a reaction solution through a gas inlet tube mounted in a reactor, the tip nozzle of which is submerged in the solution.

The particles containing as main component cerium oxide obtained by the above-mentioned process can be taken out of the reactor as slurry, and remove water-soluble impurities with the aid of ultrafiltration, filter press cleaning or the like.

Observations by transmission electron microscope (TEM) indicate that the particles comprising as a main component crystalline cerium oxide of the cubic system have a particle size ranging from 0.005 to 1 μm. In addition, as to the particles containing as an additional component a lanthanum compound, a neodymium compound or a combination thereof, wherein the additional component is contained in X/(Ce+X) molar ratio of for example 0.001 to 0.15 in which X is lanthanum atoms, neodymium atoms or a combination thereof, the particles are measured of diffraction pattern with an X-ray diffraction apparatus after drying them at 110° C. As a result of it, it is revealed that the particles have high crystallinity of cubic crystal system and are cerium oxide particles having a diffraction pattern with main peaks at diffraction angles $2\theta=28.6°, 47.5°$ and $56.4°$ and described in ASTM Card No. 34-394.

The specific surface area of the particles by a gas adsorption method (BET method) is 2 to 200 m$^2$/g.

The crystalline cerium oxide of the cubic system containing as an additional component a lanthanum compound, a neodymium compound or a combination thereof, contains preferably the additional component in X/(Ce+X) molar ratio of 0.001 to 0.5, more preferably 0.005 to 0.3 and the most preferably 0.005 to 0.15 in which X is lanthanum atoms, neodymium atoms or a combination thereof.

When the molar ratio is less than 0.001, there is no effect to be exerted by lanthanum compounds or neodymium compounds. On the other hand, when the molar ratio is more than 0.5, the crystallinity of cerium oxide particles is deteriorated.

The particles obtained in the present invention may contain other rare earth elements, such as praseodymium, samarium, gadolinium and the like that do not deteriorate the effect by the addition of lanthanum compounds or neodymium compounds.

Lanthanum and neodymium that the particles obtained in the present invention contain are contained in the form of lanthanum oxide, neodymium oxide, lanthanum hydroxide, neodymium hydroxide or the like, and forms a particle along with cerium oxide. In the particle, it is assumed that the chemical bond of a cerium atom and a lanthanum atom via an oxygen atom or the chemical bond of a cerium atom and a neodymium atom via an oxygen atom is formed in a part of the particle.

The particles containing cerium oxide as a main component and lanthanum or neodymium as other component that the present invention provide can be used as abrasives, ultraviolet absorbing materials, catalyst materials, fuel cell materials and the like in the form of sol prepared by re-dispersing the particles in aqueous medium, water-soluble organic solvent or mixed solvent of water with water-soluble organic solvent.

When the sol which particles are dispersed in a medium, wherein the particles comprise as a main component crystalline cerium oxide of the cubic system and as an additional component a lanthanum compound, a neodymium compound or a combination thereof, which the present invention provides, is left for a long time, a part of the particles precipitates but can be easily re-dispersed by stirring and return to a dispersion state. Therefore, the sol of the present invention is stable for more than one year when it is kept at ordinary temperature.

The particles comprising as a main component crystalline cerium oxide of the cubic system and as an additional component a lanthanum compound, a neodymium compound or a combination thereof, can be contained in an abrasive solution in a range of 0.01 to 50 wt %, preferably 0.1 to 30 wt %. The particles can be used as abrasives, ultraviolet absorbing materials, catalyst materials, fuel cell materials and the like by re-dispersing them in aqueous medium, water-soluble organic solvent or mixed solvent of water with water-soluble organic solvent.

The abrasive solution prepared as mentioned above can be adjusted by adding an acidic substance to a pH ranging 1 to 6. The acidic substance includes, for example nitric acid, hydrochloric acid, acetic acid or the like.

Also, the abrasive solution prepared as mentioned above can be adjusted by adding a basic substance to a pH ranging 8 to 13. The basic substance includes, for example ethanolamine, diethanolamine, triethanolamine, N,N-dimethyl-ethanolamine, methylethanolamine, monopropanolamine and ammonia in addition to sodium hydroxide, potassium hydroxide, tetramethylammonium hydroxide, etc.

The sol comprising crystalline cerium oxide particles of the present invention can contain further water-soluble polymer, anionic surfactant, nonionic surfactant or cationic surfactant. Illustrative example of them are as follows: water-soluble polymer, such as polyvinyl alcohol, acrylic polymer and ammonium salt thereof, methacrylic polymer and ammonium salt thereof, etc.; anionic surfactant, such as ammonium oleate, ammonium laurate, triethanolamine lauryl sulfate, ammonium polyoxyethylene lauryl ether sulfate, etc.; nonionic surfactant, such as polyoxyethylene lauryl ether, polyoxyethylene sorbitan monolaurate, polyoxyethylene glycol disterate, polyethylene glycol monostearate, etc. The surfactants may be added in an amount of 0.01 to 100 parts by weight on the basis of 100 parts by weight of cerium oxide particles.

The abrasive solution prepared in the present invention is suitable for polishing a substrate which comprises silica as a main component. The substrate which comprises silica as a main component is defined as a substrate comprising silica in an amount of 50 wt % or more, and includes, for example a rock crystal, a quartz glass for photomask, CMP (Chemical Mechanical Polishing) for an organic film, Inter Layer Dielectric (ILD) and shallow trench isolation of a semiconductor device, or a hard disk made of glass. The hard disk made of glass includes, for example hard disk made of crystallized glass, aluminosilicate glass or soda-lime glass.

Further, the abrasive of the present invention can be applied for polishing optical crystal materials, such as lithium niobate, lithium tantalate and the like, ceramics materials, such as aluminum nitride, alumina, ferrite, zirconium and the like, metals, such as aluminum, copper, tungsten and the like.

EXAMPLES

The present invention will hereinafter be described in more detail with reference to the following non-limitative examples, but the present invention is not restricted to these specific examples.

Example 1

A 2-liter glass reactor was charged with 253 g of aqueous 25% ammonia solution corresponding to $NH_3/(Ce^{3+}+La^{3+})$ =8 (molar ratio) and 0.5 l/min. of nitrogen gas was blown therein through a glass nozzle while keeping the liquid temperature at 30° C. In a 1-liter glass reactor, 693 g of an aqueous cerium (III) nitrate solution in which the concentration of cerium was 11.5 wt % in terms of $CeO_2$ and the purity thereof was 99.9% was mixed with 28.5 g of an aqueous lanthanum (III) nitrate solution in which the concentration of lanthanum was 14.0 wt % in terms of $La_2O_3$ and the purity thereof was 99.99% or more. The mixed solution comprised lanthanum in La/(Ce+La) molar ratio of 0.05. The mixed solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air, thereby the oxidation reaction for converting cerium (III) to cerium (IV) was started. The oxidation reaction was completed in 7 hours. The liquid after the completion of the oxidation reaction was returned to room temperature to obtain a reaction solution containing white fine particles. The reaction solution had pH of 7.9 and an electric conductivity of 148 mS/cm.

The reaction solution was washed with the aid of a suction funnel (Nutsche) to obtain 310 g of white slurry having a solid content of 24.5 wt %, pH of 5.2 and an electric conductivity of 43 μS/cm. The washed slurry was observed by transmission electron microscope (TEM) and it was verified that the particles therein had the primary particle size of 50 to 100 nm. The yield of the particles was approximately 100%. The particles were dried and the powder X-ray diffraction observation for the dried particles revealed that the obtained particles had characteristic peaks that coincided with the characteristic peaks of crystalline cerium oxide of cubic crystal system having a diffraction pattern with main peaks at diffraction angles 2θ=28.6°, 47.5° and 56.4° and described in ASTM Card No. 34-394. The particles contained lanthanum in La/(Ce+La) molar ratio of 0.05. The specific surface area value of the particles by a nitrogen adsorption method (BET method) was 23.3 m²/g.

Nitric acid was added to the washed particles in an amount of $HNO_3/CeO_2$=0.12 wt %, and further the resulting mixture was adjusted with pure water to a solid content of 10 wt % to prepare as an abrasive solution a sol having pH of 4.6, an electric conductivity of 145 μS/cm and a viscosity of 1.3 mPa·S.

Example 2

A 2-liter glass reactor was charged with 253 g of aqueous 25% ammonia solution corresponding to $NH_3/(Ce^{3+}+La^{3+})$ =8 (molar ratio) and 0.5 l/min. of nitrogen gas was blown therein through a glass nozzle while keeping the liquid temperature at 30° C. In a 1-liter glass reactor, 693 g of an aqueous cerium (III) nitrate solution in which the concentration of cerium was 11.5 wt % in terms of $CeO_2$ and the purity thereof was 99.9% was mixed with 28.5 g of an aqueous lanthanum (III) nitrate solution in which the concentration of lanthanum was 14 wt % in terms of $La_2O_3$ and the purity thereof was 99.99% or more. The mixed solution comprised lanthanum in La/(Ce+La) molar ratio of 0.05. The mixed solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air, thereby the oxidation reaction for converting cerium (III) to cerium (IV) was started. The oxidation reaction was completed in 7 hours. The liquid after the completion of the oxidation reaction was returned to room temperature to obtain a reaction solution containing white fine particles. The reaction solution had pH of 7.9 and an electric conductivity of 148 mS/cm.

The reaction solution was washed with the aid of a suction funnel to obtain 310 g of white slurry having a solid content of 24.5 wt %, pH of 5.2 and an electric conductivity of 43 μS/cm. The washed slurry was observed by transmission electron microscope (TEM) and it was verified that the particles therein had the primary particle size of 50 to 100 nm. The yield of the particles was approximately 100%. The particles were dried and the powder X-ray diffraction observation for the dried particles revealed that the obtained particles had characteristic peaks that coincided with the characteristic peaks of crystalline cerium oxide of cubic crystal system having a diffraction pattern with main peaks at diffraction angles 2θ=28.6°, 47.5° and 56.4° and described in ASTM Card No. 34-394. The specific surface area value of the particles by a nitrogen adsorption method was 23.3 m²/g.

A 2-liter glass reactor was charged with 310 g of the washed slurry, 134 g of pure water, 33 g of ammonium hydrogencarbonate and 29 g of aqueous 25% ammonia solution, the temperature of the resulting mixture was then elevated to 90° C. and kept at the temperature for 6 hours. The reaction solution was returned to room temperature to obtain a reaction solution containing white fine particles. The reaction solution had pH of 10.0 and an electric conductivity of 7.4 mS/cm. The reaction solution was washed with the aid of a suction funnel to obtain 285 g of white slurry having a solid content of 24.1 wt %, pH of 5.3 and an electric conductivity of 15 μS/cm. The washed slurry was observed by transmission electron microscope (TEM) and it was verified that the particles therein had no change in particle size. In addition, the particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. Further, the particles contained lanthanum in La/(Ce+La) molar ratio of 0.05.

Nitric acid was added to the washed particles in an amount of $HNO_3/CeO_2=0.12$ wt %, and further the resulting mixture was adjusted with pure water to a solid content of 10 wt % to prepare as an abrasive solution a sol having pH of 4.5, an electric conductivity of 139 μS/cm and a viscosity of 1.3 mPa·S.

Example 3

A 2-liter glass reactor was charged with 253 g of aqueous 25% ammonia solution corresponding to $NH_3/(Ce^{3+}+La^{3+})$ =8 (molar ratio) and 0.5 l/min. of nitrogen gas was blown therein through a glass nozzle while keeping the liquid temperature at 30° C. In a 1-liter glass reactor, 693 g of an aqueous cerium (III) nitrate solution in which the concentration of cerium was 11.5 wt % in terms of $CeO_2$ and the purity thereof was 99.9% was mixed with 56.8 g of an aqueous lanthanum (III) nitrate solution in which the concentration of lanthanum was 14 wt % in terms of $La_2O_3$ and the purity thereof was 99.99% or more. The mixed solution comprised lanthanum in La/(Ce+La) molar ratio of 0.10. The mixed solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air, thereby the oxidation reaction for converting cerium (III) to cerium (IV) was started. The oxidation reaction was completed in 7 hours. The liquid after the completion of the oxidation reaction was returned to room temperature to obtain a reaction solution containing white fine particles. The reaction solution had pH of 8.4 and an electric conductivity of 150 mS/cm.

The reaction solution was washed with the aid of a suction funnel to obtain 290 g of white slurry having a solid content of 26.0 wt %, pH of 6.4 and an electric conductivity of 122 μS/cm. The washed slurry was observed by transmission electron microscope (TEM) and it was verified that the particles therein had the primary particle size of 50 to 150 nm. The particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. The particles contained lanthanum in La/(Ce+La) molar ratio of 0.10. The specific surface area value of the particles by a nitrogen adsorption method was 24.1 $m^2/g$.

Nitric acid was added to the washed particles in an amount of $HNO_3/CeO_2=0.12$ wt %, and further the resulting mixture was adjusted with pure water to a solid content of 10 wt % to prepare a sol having pH of 5.4, an electric conductivity of 215 μS/cm and a viscosity of 1.5 mPa·S.

A 2-liter glass reactor was charged with 290 g of the washed slurry, 148 g of pure water, 33 g of ammonium hydrogencarbonate and 29 g of aqueous 25% ammonia solution, the temperature of the resulting mixture was then elevated to 90° C. and kept at the temperature for 6 hours. The reaction solution was returned to room temperature to obtain a reaction solution containing white fine particles. The reaction solution had pH of 10.0 and an electric conductivity of 7.4 mS/cm. The reaction solution was washed with the aid of a suction funnel to obtain 285 g of white slurry having a solid content of 24.1 wt %, pH of 5.3 and an electric conductivity of 15 μS/cm. The washed slurry was observed by transmission electron microscope (TEM) and it was verified that the particles therein had no change in primary particle size. In addition, the particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. Further, the particles contained lanthanum in La/(Ce+La) molar ratio of 0.10.

Nitric acid was added to the washed particles in an amount of $HNO_3/CeO_2=0.12$ wt %, and further the resulting mixture was adjusted with pure water to a solid content of 10 wt % to prepare as an abrasive solution a sol having pH of 5.2, an electric conductivity of 192 μS/cm and a viscosity of 1.5 mPa·S.

Example 4

A 2-liter glass reactor was charged with 169 g of aqueous 28% ammonia solution corresponding to $NH_3/(Ce^{3+}+Nd^{3+})$ =8 (molar ratio) and 69 g of pure water, and 0.5 l/min. of nitrogen gas was blown therein through a glass nozzle while keeping the liquid temperature at 30° C. In a 1-liter glass reactor, 684 g of an aqueous cerium (III) nitrate solution in which the concentration of cerium was 11.5 wt % in terms of $CeO_2$ and the purity thereof was 99.9% was mixed with 12.5 g of an aqueous neodymium (III) nitrate solution in which the concentration of neodymium was 10.5 wt % in terms of $Nd_2O_3$ and the purity thereof was 99.99% or more, and 65 g of pure water. The mixed solution comprised neodymium in Nd/(Ce+Nd) molar ratio of 0.02. The mixed solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air, thereby the oxidation reaction for converting cerium (III) to cerium (IV) was started. The oxidation reaction was completed in 7 hours and 50 minutes. The liquid after the completion of the oxidation reaction was returned to room temperature to obtain a reaction solution containing white fine particles. The reaction solution had pH of 8.3 and an electric conductivity of 135 mS/cm.

The reaction solution was washed with the aid of a suction funnel to obtain 300 g of white slurry having a solid content of 26.3 wt %, pH of 5.3 and an electric conductivity of 24 μS/cm. The washed slurry was observed by transmission electron microscope (TEM) and it was verified that the particles therein had the primary particle size of 50 to 150 nm. The yield of the particles was approximately 100%. The particles were dried and the powder X-ray diffraction observation for the dried particles revealed that the obtained particles had characteristic peaks that coincided with the characteristic peaks of crystalline cerium oxide of cubic crystal system having a diffraction pattern with main peaks at diffraction angles $2\theta=28.6°$, 47.5° and 56.4° and described in ASTM Card No. 34-394. The particles contained neodymium in Nd/(Ce+Nd) molar ratio of 0.02. In addition, the measurements for the particle size of the particles by a centrifugal particle size distribution measuring apparatus (CAPA-700, manufactured by Horiba Ltd.) revealed to have the particle size of 0.42 μm. The particle size by dynamic light scattering method with the aid of N4 (manufactured by Coulter Electronics, Inc.) was 300 nm. The specific surface area value of the particles by a nitrogen adsorption method was 20.3 $m^2/g$.

Nitric acid was added to the washed particles in an amount of $HNO_3/CeO_2=0.12$ wt %, and further the resulting mixture was adjusted with pure water to a solid content of 10 wt % to prepare as an abrasive solution a sol having pH of 3.9, an electric conductivity of 108 μS/cm and a viscosity of 1.9 mPa·S.

Example 5

A 1-liter glass reactor was charged with 188 g of white slurry having a solid content of 26.3 wt %, pH of 5.3 and an electric conductivity of 24 μS/cm that was obtained in Example 4, and 67 g of aqueous 30% ammonium carbonate solution was added thereto, and the temperature of the mixture was then elevated to 90° C. and kept at the temperature for 6 hours. Thereafter, the reaction solution was returned to room temperature to obtain a reaction solution containing white fine particles. The reaction solution had pH of 10.1 and an electric conductivity of 6.3 mS/cm. The reaction solution was washed with the aid of a suction funnel to obtain 150 g of white slurry having a solid content of 26.1 wt %, pH of 7.1 and an electric conductivity of 14 μS/cm. The washed slurry was observed by transmission electron microscope (TEM) and it was verified that the particles therein had no change in particle size. The particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. The particles contained neodymium in Nd/(Ce+Nd) molar ratio of 0.02.

Nitric acid was added to the washed particles in an amount of $HNO_3/CeO_2=0.12$ wt %, and further the resulting mixture was adjusted with pure water to a solid content of 10 wt % to prepare as an abrasive solution a sol having pH of 3.9, an electric conductivity of 108 μS/cm and a viscosity of 1.3 mPa·S.

Example 6

A 2-liter glass reactor was charged with 169 g of aqueous 28% ammonia solution corresponding to $NH_3/(Ce^{3+}+Nd^{3+})=8$ (molar ratio) and 19 g of pure water, and 0.5 l/min. of nitrogen gas was blown therein through a glass nozzle while keeping the liquid temperature at 30° C. In a 1-liter glass reactor, 668 g of an aqueous cerium (III) nitrate solution in which the concentration of cerium was 11.5 wt % in terms of $CeO_2$ and the purity thereof was 99.9% was mixed with 29.3 g of an aqueous neodymium (III) nitrate solution in which the concentration of neodymium was 10.5 wt % in terms of $Nd_2O_3$ and the purity thereof was 99.99% or more, and 64 g of pure water. The mixed solution comprised neodymium in Nd/(Ce+Nd) molar ratio of 0.05. The mixed solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air, thereby the oxidation reaction for converting cerium (III) to cerium (IV) was started. The oxidation reaction was completed in 6 hours and 40 minutes. The liquid after the completion of the oxidation reaction was returned to room temperature to obtain a reaction solution containing white fine particles. The reaction solution had pH of 8.4 and an electric conductivity of 134 mS/cm.

The reaction solution was washed with the aid of a suction funnel to obtain 314 g of white slurry having a solid content of 25.5 wt %, pH of 5.2 and an electric conductivity of 28 μS/cm. The washed slurry was observed by transmission electron microscope (TEM) and it was verified that the particles therein had the primary particle size of 50 to 150 nm. The particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. The particles contained neodymium in Nd/(Ce+Nd) molar ratio of 0.05. In addition, the measurements for the particle size of the particles by a centrifugal particle size distribution measuring apparatus (CAPA-700, manufactured by Horiba Ltd.) revealed to have the particle size of 0.64 μm. The particle size by dynamic light scattering method with the aid of N4 (manufactured by Coulter Electronics, Inc.) was 353 nm. The specific surface area value of the particles by a nitrogen adsorption method was 23.6 m²/g.

A 1-liter glass reactor was charged with 314 g of the washed slurry and 133 g of aqueous 30% ammonium carbonate solution, the temperature of the resulting mixture was then elevated to 90° C. and kept at the temperature for 6 hours. The reaction solution was returned to room temperature to obtain a reaction solution containing white fine particles. The reaction solution had pH of 10.0 and an electric conductivity of 7.0 mS/cm. The reaction solution was washed with the aid of a suction funnel to obtain 300 g of white slurry having a solid content of 26.6 wt %, pH of 7.5 and an electric conductivity of 33 μS/cm. The washed slurry was observed by transmission electron microscope (TEM) and it was verified that the particles therein had no change in primary particle size. In addition, the particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. Further, the particles contained neodymium in Nd/(Ce+Nd) molar ratio of 0.05.

Nitric acid was added to the washed particles in an amount of $HNO_3/CeO_2=0.12$ wt %, and further the resulting mixture was adjusted with pure water to a solid content of 10 wt % to prepare as an abrasive solution a sol having pH of 4.2, an electric conductivity of 127 μS/cm and a viscosity of 1.5 mPa·S.

Comparative Example 1

A 500-liter glass lining reactor was charged with 44.3 kg of pure water and 94.8 kg of aqueous 25% ammonia solution corresponding to $NH_3/Ce^{3+}=6$ (molar ratio), and 3 Nm³/hour of nitrogen gas was blown therein through a resin nozzle while keeping the liquid temperature at 30° C. Then, 508.0 kg of cerium (III) nitrate in which the concentration of cerium was 7.84 wt % in terms of $CeO_2$ and the purity thereof was 99.9% was gradually added thereto with stirring over 30 minutes to obtain a suspension of hydroxides. The temperature of the suspension was then elevated to 75° C. Thereafter, the gas to be blown through the resin nozzle was switched from nitrogen gas to 4 Nm³/hour of air and the oxidation reaction for converting cerium (III) to cerium (IV) was started. The oxidation reaction was completed in 5 hours. The liquid after the completion of the oxidation reaction was returned to room temperature to obtain a reaction solution containing white fine particles. The reaction solution had pH of 9.4 and an electric conductivity of 119 mS/cm.

The reaction solution was washed with the aid of a rotary filter press (manufactured by Kotobuki Giken Co., Ltd.) to obtain 173 kg of white slurry having a solid content of 19.3 kg, pH of 9.1 and an electric conductivity of 81 µS/cm. The washed slurry was observed by transmission electron microscope (TEM) and it was verified that the particles therein had the primary particle size of 40 to 100 nm. The yield of the particles was approximately 100%. The particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. The specific surface area value of the particles by a nitrogen adsorption method was 28.0 m$^2$/g.

Nitric acid was added to the washed particles in an amount of HNO$_3$/CeO$_2$=0.12 wt %, and further the resulting mixture was adjusted with pure water to a solid content of 10 wt % to prepare as an abrasive solution a sol having pH of 4.4, an electric conductivity of 125 µS/cm and a viscosity of 1.4 mPa·S.

Comparative Example 2

A 500-liter glass lining reactor was charged with 44.3 kg of pure water and 94.8 kg of aqueous 25% ammonia solution corresponding to NH$_3$/Ce$^{3+}$=6 (molar ratio), and 3 Nm$^3$/hour of nitrogen gas was blown therein through a resin nozzle while keeping the liquid temperature at 30° C. Then, 508.0 kg of cerium (III) nitrate solution in which the concentration of cerium was 7.84 wt % in terms of CeO$_2$ and the purity thereof was 99.9% was gradually added thereto with stirring over 30 minutes to obtain a suspension of hydroxides. The temperature of the suspension was then elevated to 75° C. Thereafter, the gas to be blown through the resin nozzle was switched from nitrogen gas to 4 Nm$^3$/hour of air and the oxidation reaction for converting cerium (III) to cerium (IV) was started. The oxidation reaction was completed in 5 hours. The liquid after the completion of the oxidation reaction was returned to room temperature to obtain a reaction solution containing white fine particles. The reaction solution had pH of 9.4 and an electric conductivity of 119 mS/cm.

The reaction solution was washed with the aid of a rotary filter press (manufactured by Kotobuki Giken Co., Ltd.) to obtain white slurry having a solid content of 19.3 kg, pH of 9.1 and an electric conductivity of 81 µS/cm. The washed slurry was observed by transmission electron microscope (TEM) and it was verified that the particles therein had the primary particle size of 40 to 100 nm. The yield of the particles was approximately 100%. The particles were dried and the powder X-ray diffraction observation for the dried particles revealed that the obtained particles had characteristic peaks that coincided with the characteristic peaks of crystalline cerium oxide of cubic crystal system described in ASTM Card No. 34-394.

A 500-liter glass lining reactor was charged with 173 kg of the washed slurry again, and further 47.2 kg of pure water, 16.5 kg of ammonium hydrogencarbonate and 14.2 kg of aqueous 25% ammonia solution, the temperature of the resulting mixture was then elevated to 90° C. and kept at the temperature for 6 hours. The reaction solution was returned to room temperature to obtain a reaction solution containing white fine particles. The reaction solution had pH of 10.5 and an electric conductivity of 16.1 mS/cm. The reaction solution was washed with the aid of a rotary filter press to obtain 150 g of white slurry having a solid content of 23.2 wt %, pH of 5.5 and an electric conductivity of 26 µS/cm. The washed slurry was observed by transmission electron microscope (TEM) and it was verified that the particles therein had no change in particle size. In addition, the particles were dried and the powder X-ray diffraction observation for the dried particles revealed that the obtained particles had characteristic peaks that coincided with the characteristic peaks of crystalline cerium oxide of cubic crystal system described in ASTM Card No. 34-394. In addition, the measurements for the particle size of the particles by a centrifugal particle size distribution measuring apparatus (CAPA-700, manufactured by Horiba Ltd.) revealed to have the particle size of 0.48 µm. The particle size by dynamic light scattering method with the aid of N4 (manufactured by Coulter Electronics, Inc.) was 323 nm. The specific surface area value of the particles by a nitrogen adsorption method was 26.8 m$^2$/g.

Nitric acid was added to the washed particles in an amount of HNO$_3$/CeO$_2$=0.12 wt %, and further the resulting mixture was adjusted with pure water to a solid content of 10 wt % to prepare as an abrasive solution a sol having pH of 4.9, an electric conductivity of 156 µS/cm and a viscosity of 1.4 mPa·S.

Comparative Example 3

A 2-liter glass reactor was charged with 253 g of aqueous 25% ammonia solution corresponding to NH$_3$/La$^{3+}$=8 (molar ratio) and 0.5 l/min. of nitrogen gas was blown therein through a glass nozzle while keeping the liquid temperature at 30° C. In a 1-liter glass reactor, was dissolved 568 g of an aqueous lanthanum (III) nitrate solution in which the concentration of lanthanum was 14.0 wt % in terms of La$_2$O$_3$ and the purity thereof was 99.99% or more. The mixed solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air. The air was blown therein for 7 hours. Thereafter, the reaction solution was returned to room temperature to obtain a reaction solution containing white fine particles. The reaction solution had pH of 8.4 and an electric conductivity of 150 mS/cm.

The reaction solution was washed with the aid of a suction funnel to obtain 380 g of white slurry having a solid content of 20.0 wt %, pH of 8.5 and an electric conductivity of 150 µS/cm. The washed slurry was observed by transmission electron microscope (TEM) and it was verified that the particles therein were needle particles having the particle size of a few µm. The particles were dried and the powder X-ray diffraction observation for the dried particles revealed that the obtained particles had characteristic peaks that coincided with the characteristic peaks of lanthanum hydroxide described in ASTM Card No. 36-1481.

Comparative Example 4

A 2-liter glass reactor was charged with 253 g of aqueous 25% ammonia solution corresponding to NH$_3$/Nd$^{3+}$=8 (molar ratio) and 0.5 l/min. of nitrogen gas was blown therein through a glass nozzle while keeping the liquid temperature at 30° C. In a 1-liter glass reactor, was dissolved 568 g of an aqueous neodymium (III) nitrate solution in which the concentration of neodymium was 14.0 wt % in terms of Nd$_2$O$_3$ and the purity thereof was 99.99% or more. The solution was gradually added into the 2-liter glass reactor mentioned above over 30 minutes with stirring to obtain a suspension of hydroxides. The temperature of the suspension was then elevated to 80° C. Thereafter, the gas to be blown through the glass nozzle was switched from nitrogen gas to 0.5 l/min. of air. The air was blown therein for 7 hours. Thereafter, the reaction solution was returned to room temperature to obtain a reaction solution containing white fine particles. The reaction solution had pH of 8.0 and an electric conductivity of 150 mS/cm.

The reaction solution was washed with the aid of a suction funnel to obtain 370 g of white slurry having a solid content of 20.5 wt %, pH of 7.8 and an electric conductivity of 150 µS/cm. The washed slurry was observed by transmission electron microscope (TEM) and it was verified that the particles therein were needle particles having the particle size of a few µm. The particles were dried and the powder X-ray diffraction observation for the dried particles revealed that the obtained particles had characteristic peaks that coincided with the characteristic peaks of neodymium hydroxide described in ASTM Card No. 6-601.

FIG. 1 is a chart showing powder X-ray diffraction observed for the powders prepared in Example 1 and Comparative Examples 1 and 3, wherein (1) indicates powder X-ray diffraction observed for particles containing lanthanum compound in La/(Ce+La) molar ratio of 0 (that is, only cerium oxide particles) that are prepared in Comparative Example 1, (2) indicates powder X-ray diffraction observed for particles containing lanthanum compound in La/(Ce+La) molar ratio of 0.05 that are prepared in Example 1, and (3) indicates powder X-ray diffraction observed for particles containing lanthanum compound in La/(Ce+La) molar ratio of 1 (that is, lanthanum hydroxide particles) that are prepared in Comparative Example 3. The particles in the molar ratio of 0 or 0.05 have high crystallinity, and there is no difference between both particles in the positions of peaks. The particles of lanthanum hydroxide have low crystallinity.

Figure 2:
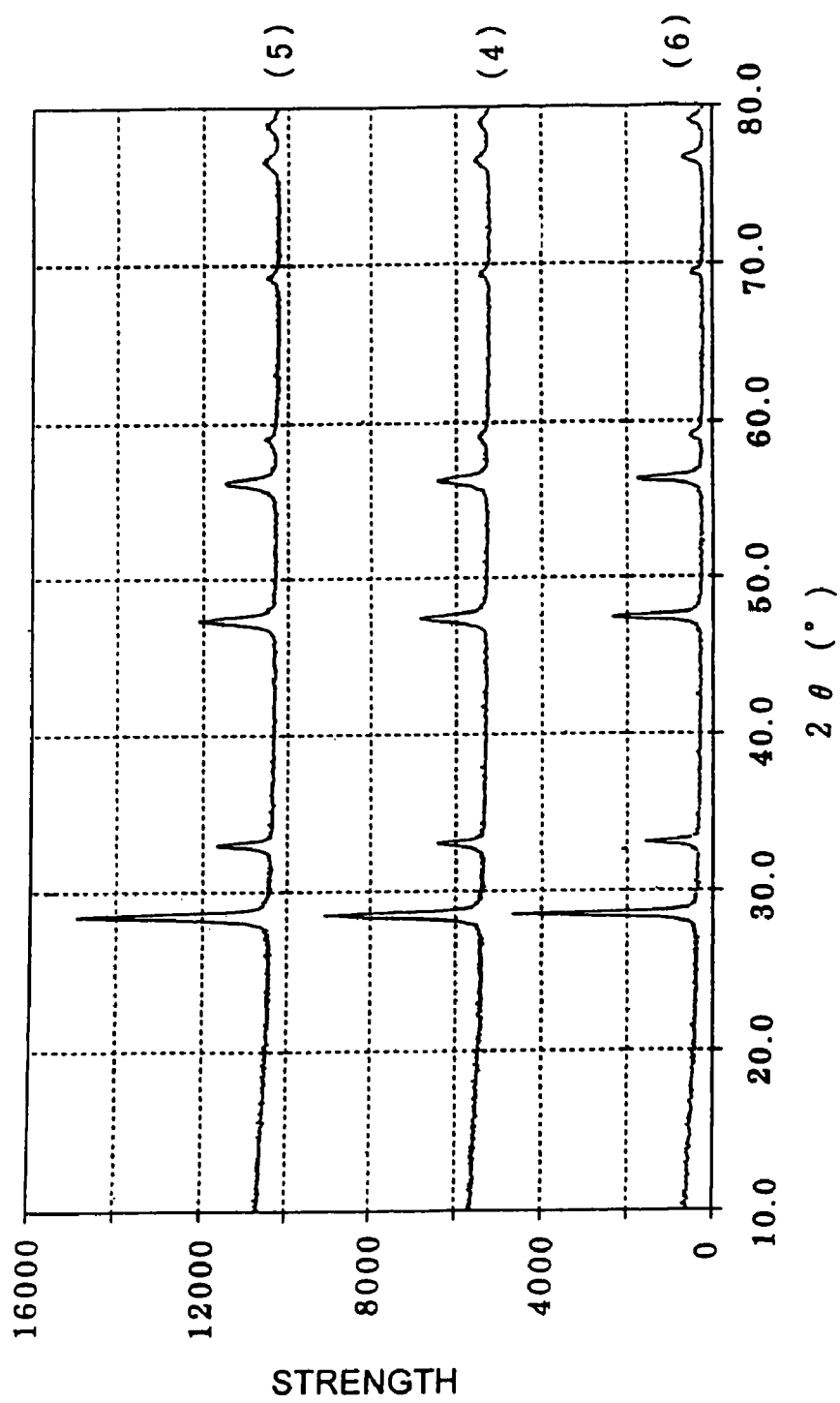
FIG. 2 is a chart showing powder X-ray diffraction observed for the powders prepared in Examples 5 and 6 and Comparative Example 1, wherein (4) indicates powder X-ray diffraction observed for particles prepared in Example 5, (5) indicates powder X-ray diffraction observed for particles prepared in Example 6, and (6) indicates powder X-ray diffraction observed for particles prepared in Comparative Example 1.

FIG. 2 is a chart showing powder X-ray diffraction observed for the powders prepared in Examples 5 and 6 and Comparative Example 1, wherein (4) indicates powder X-ray diffraction observed for particles prepared in Example 5, (5) indicates powder X-ray diffraction observed for particles prepared in Example 6, and (6) indicates powder X-ray diffraction observed for particles prepared in Comparative Example 1.

Figure 3:
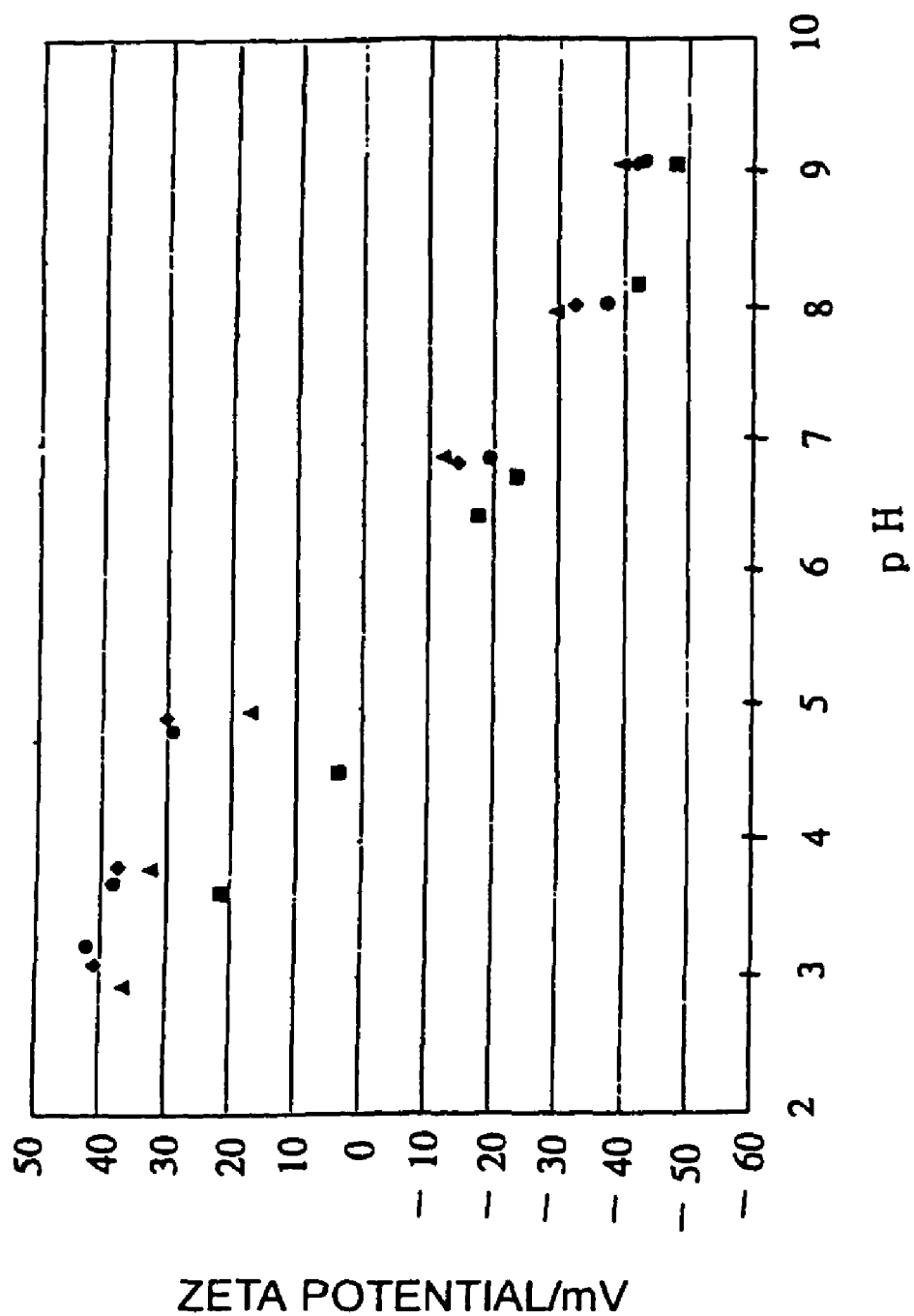
FIG. 3 is a chart showing zeta potential measured for four sols which particles in La/(Ce+La) molar ratio of 0, 0.01, 0.05 or 0.10 are dispersed in water, respectively.

FIG. 3 is a chart showing zeta potential measured for four sols which particles in La/(Ce+La) molar ratio of 0 (■), 0.01 (▲), 0.05 (●) or 0.10 (♦) are dispersed in water, respectively. The particles in the molar ratio of 0.01, 0.05 or 0.10 change in the surface potential more than those in the molar ratio of 0. That is, it is assumed that the change of surface potential sets up the borderline between the molar ratios 0 and 0.01.

FIGS. 4 to 10 are photographs by transmission electron microscope of the particles prepared in Examples 1, 3, 5 and 6, and Comparative Examples 1, 3 and 4, respectively. The shape of the particles prepared in Examples 1 and 3 is similar to that in Comparative Example 1 comprising only cerium oxide. On the other hand, lanthanum hydroxide prepared in Comparative Example 3 is needle particles.

It is assumed that the particles comprising crystalline cerium oxide as a main component and a lanthanum compound as an additional component, which are produced in Examples 1 to 3 have the lanthanum component on the surface thereof.

Polishing test was carried out for abrasive solutions prepared in Examples 1 to 6 and Comparative Examples 1 and 2 as follows:

Polishing machine (trade name: LAPMASTER 18, manufactured by Lapmaster Corp.);

Polishing pad: non-woven fabric impregnated with polyurethane (trade name: POLITEX DG, manufactured by Rhodel Nitta Inc.);

Object to be polished: quartz glass (φ95.5 mm);

Revolution: 40 rpm

Polishing pressure: 80 g/cm$^2$; and

Polishing time: 10 minutes.

The following results were obtained in the polishing test.

The sol prepared in Example 1 has a removal rate of 2.0 µm/hour, and makes the surface of polished object good and smooth.

The sol prepared in Example 2 has a removal rate of 4.1 µm/hour, and makes the surface of polished object good and smooth.

The sol prepared in Example 3 has a removal rate of 3.7 µm/hour, and makes the surface of polished object good and smooth.

The sol prepared in Example 4 has a removal rate of 1.4 µm/hour, and makes the surface of polished object good and smooth.

The sol prepared in Example 5 has a removal rate of 2.1 µm/hour, and makes the surface of polished object good and smooth.

The sol prepared in Example 6 has a removal rate of 2.4 µm/hour, and makes the surface of polished object good and smooth.

The sol prepared in Comparative Example 1 has a removal rate of 0.7 µm/hour, and does not make the surface of polished object so good as those in Examples 1 to 6.

The sol prepared in Comparative Example 2 has a removal rate of 1.1 µm/hour, and does not make the surface of polished object so good as those in Examples 1 to 6.

It is verified that the sols prepared in Examples 1 and 4 have higher removal rates than that in Comparative Example 1, and make the surface of polished object good and smooth, by the comparison of the results between Examples 1 and 4 and Comparative Example 1.

In addition, it is verified that the sols prepared in Examples 2, 3, 5 and 6 that were subjected to surface-modification with ammonium salts (ammonium carbonate or ammonium hydrogencarbonate) have higher removal rates than that in Comparative Example 2, and make the surface of polished object good and smooth.

The present invention is characterized by reacting aqueous solution which a cerium (III) salt is mixed with a lanthanum (III) salt, a neodymium (III) salt or a combination thereof in X/(Ce+X) molar ratio of 0.001 to 0.5, with an alkaline substance in $(OH^-)/(Ce^{3+}+X^{3+})$ molar ration of 3 to 30 wherein X is lanthanum atoms, neodymium atoms or a combination thereof, to give a suspension in which cerium (III) hydroxide and a hydroxide of the trivalent additional component X are homogeneously mixed, and immediately blowing oxygen or a gas containing oxygen into the suspension at a temperature of 10 to 95° C. under open to the air.

The distribution of the particle size of the resulting particles comprising cerium oxide as a main component varies depending on whether the first step is carried out under open to the air or under an atmosphere of an inert gas, in which a suspension is provided by mixing a cerium (III) salt with a lanthanum (III) salt, a neodymium (III) salt or a combination thereof as an additional component to obtain a mixture and adding an alkaline substance to the mixture. When the first step is carried out under open to the air, the distribution comes to be broad, whereas when the first step is carried out under an atmosphere of an inert gas, the distribution comes to be narrow.

The particles of the present invention comprising cerium oxide as a main component and lanthanum compounds or neodymium compounds as an additional component are suitable as an abrasive for a substrate which comprises silica as a main component, and enables to polishing at high removal rate and gives the surface of polished object with high quality.

Accordingly, the particles of the present invention are suitable for CMP (Chemical Mechanical Polishing). In particular, the particles are suitable as an abrasive used in a process of isolating elements of semiconductor device that is generally called STI (Shallow Trench Isolation) because it can accurately polish an object to be polished without damage to silicon nitride film used as a protective film. The particles are also suitable as an abrasive for polishing low permittivity materials for Inter Layer Dielectric (ILD) of semiconductor device, such as siloxanes, organic polymers, porous materials, CVD polymers, etc. The siloxanes include, for example hydrogenated methylsilsesquioxane, methylsilsesquioxane or the like. The organic polymers include, for example polyarylene ether, heat polymerizable hydrocarbons, perfluorohydrocarbons, polykiroline, fluorinated polyimides or the like. The porous materials include, for example xerogel, silica colloid or the like. The CVD polymers include, for example fluorocarbons, aromatic hydrocarbon polymers, siloxane polymers or the like.

The abrasive of the present invention can be applied for polishing optical crystal materials, such as lithium niobate, lithium tantalate and the like, ceramics materials, such as aluminum nitride, alumina, ferrite, zirconium and the like, metals, such as aluminum, copper, tungsten and the like.

The sols prepared by the present invention can be utilized for ultraviolet absorbing materials, catalyst materials, fuel cell materials and the like, in addition to abrasives.

What is claimed is:

1. An abrasive for polishing a rock crystal, a quartz glass for a photomask, a semiconductor device or a hard disk made of glass, the abrasive comprising a sol, which includes particles dispersed in an aqueous medium, wherein:
    the particles comprise as a main component crystalline cerium oxide of cubic system and as an additional component a lanthanum compound, neodymium compound or a combination thereof;
    the additional component is contained in an X/(Ce+X) molar ratio of 0.005 to 0.15 in which X is lanthanum atoms, neodymium atoms or a combination thereof;
    the particles are present in the abrasive in an amount of 0.1 to 50 wt %;
    the particles have a particle size of 50 to 150 nm;
    the particles have a specific surface area of 2 to 200 $m^2/g$; and
    the abrasive has a pH of 3 to 4.6.

2. An abrasive according to claim 1, wherein the additional component is a lanthanum compound.

3. An abrasive according to claim 1, wherein the additional component is a neodymium compound.

4. An abrasive according to claim 1, wherein the sol further comprises at least one selected from the group consisting of a water soluble polymer, an anionic surfactant, a nonionic surfactant and a cationic surfactant.

5. An abrasive according to claim 1, wherein the abrasive has a pH of 3 to 4.

6. An abrasive for polishing an organic film with the Chemical Mechanical Polishing method, an Inter Layer Dielectric (ILD), or a shallow trench isolation of a semiconductor device, the abrasive comprising a sol, which includes particles dispersed in an aqueous medium, wherein:
    the particles comprise as a main component crystalline cerium oxide of cubic system and as an additional component a lanthanum compound, neodymium compound or a combination thereof;
    the additional component is contained in an X/(Ce+X) molar ratio of 0.005 to 0.15 in which X is lanthanum atoms, neodymium atoms or a combination thereof;
    the particles are present in the abrasive in an amount of 0.1 to 50 wt %;
    the particles have a particle size of 50 to 150 nm;
    the particles have a specific surface area of 2 to 200 $m^2/g$; and
    the abrasive has a pH of 3 to 4.6.

7. An abrasive according to claim 6, wherein the additional component is a lanthanum compound.

8. An abrasive according to claim 6, wherein the additional component is a neodymium compound.

9. An abrasive according to claim 6, wherein the sol further comprises at least one selected from the group consisting of a water soluble polymer, an anionic surfactant, a nonionic surfactant and a cationic surfactant.

10. An abrasive according to claim 6, wherein the abrasive has a pH of 3 to 4.

* * * * *